United States Patent [19]

Baumann

[11] 3,960,177
[45] June 1, 1976

[54] LOW TORQUE AND LOW NOISE BUTTERFLY VALVE DISC

[76] Inventor: Hans D. Baumann, P.O. Box 92, Manville, R.I. 02838

[22] Filed: Mar. 12, 1975

[21] Appl. No.: 557,799

[52] U.S. Cl............................ 137/625.31; 251/305; 251/121
[51] Int. Cl.² ..................... F16K 1/22; F16K 47/04
[58] Field of Search.................. 137/625.31, 625.3; 251/305, 121

[56] References Cited
UNITED STATES PATENTS

| | | | |
|---|---|---|---|
| 965,322 | 7/1910 | Peterson | 251/305 X |
| 1,131,371 | 3/1915 | Hatfield | 251/305 X |
| 1,302,891 | 5/1919 | Balthasar | 251/305 |
| 2,882,010 | 4/1959 | Bryant | 137/625.3 X |
| 3,298,677 | 1/1967 | Anderson | 251/305 X |
| 3,677,297 | 7/1972 | Walton | 251/305 X |

FOREIGN PATENTS OR APPLICATIONS 420,756  3/1967  Switzerland......................... 251/305

*Primary Examiner*—Arnold Rosenthal

[57] ABSTRACT

A butterfly valve disc with generally oval plane surface, tiltingly arranged so that the outer periphery forms a perfect circle intersecting with the inner bore of a butterfly valve, and where the outer rim of the disc further supports a row of ribs arranged generally parallel to the circular bore of said butterfly valve and pointing in opposite directions below and above the disc's horizontal axis and forming between themselves a number of flow passages, the trapezoidal cross-section of which gradually constricts the fluid towards its discharge side.

4 Claims, 4 Drawing Figures

LOW TORQUE AND LOW NOISE BUTTERFLY VALVE DISC

BRIEF SUMMARY AND BACKGROUND OF THE INVENTION

Butterfly valves used for automatic control reduce pressure, particularly at low flow i.e. low disc openings. Such pressure reduction can only be accomplished by acelleration and subsequent decelleration of the passing medium, where the maximum velocity is a square root function of the pressure drop. Unfortunately, such high velocities along the leading edges of butterfly valves produce undesireable side effects. Such side effects are cavitation with liquid media, aerodynamic throttling noise with gases, and a high dynamic torque with either medium. Such dynamic torque, increasing rapidly towards the fully open position and reaching a peak near 70° disc opening (see curve A in FIG. 4), greatly interferes with the stable valve operation particularly when pneumatic actuators are employed, and is a function of the suction effect (much like the "lift" of an airplane wing) produced by high velocity on the upper surface of that portion of the disc pointing in the downstream direction.

Past butterfly discs of improved designs have tried to overcome this dynamic torque problem, notably among them a disc whose terminating downstream periphery has the shape of a fishtail. Another design employs semi-circular cavities on opposing sides of the circular disc. While those designs show improvements in reduction of dynamic torque, neither of them meets the additional objections of my invention, which are:

a. reduce cavitation;
 b. provide tight shut-off;
 c. create a better control characteristic;
 d. have a low aerodynamic noise level.

My invention produces substantially less dynamic torque by creating local vortexes around the outer periphery of the disc produced by vertical ribs which break up the uniform velocity profile on the upper disc surface, similar to "spoilers" on top of airplane wings. Furthermore, rather than creating a single semi-circular jet on each half of a present state of the art disc, which attaches to the pipe wall and can create cavitation and noise, my invention in contrast provides for small individual streams which discharge into a relatively large volume (in comparison to the cross-section of the jet) thereby losing nearly all of its velocity head, i.e., having very little "pressure recovery". Low pressure recovery means lower initial jet velocity, therefore lower dynamic torque and less chance for cavitation. For gaseous media, this system produces considerably less aerodynamic noise, since the sound pressure level of a jet increases to the eighth power of its velocity. This means in practice, that if the velocity (due to change in pressure recovery from 80% to 20% for example) can be reduced to half its original value (for the same pressure drop), then the sound power is reduced 256 times!

My invention also provides means to combine tight shut-off with the other aforementioned advantages, in that its configuration (contrary to other "low torque" designs) allows an angular attachment, usually between 15° and 20° to the vertical valve axis, of the outer disc periphery to provide metallic contact and thereby greatly reduced valve leakage. The angle of contact is chosen depending on the type of material employed, that is the tangent of the angle has to exceed the coefficient of static friction to avoid self-locking.

A further object of my invention, as mentioned before, is the ability to create a better relationship between flow rate and valve stroke i.e. disc rotation. The most desired characteristic of this type is called "equal percentage", i.e. where the flow rate increases in equal percentage values from the previous rate for each degree of disc rotation. Such characteristic requires relatively little flow rate at the beginning of the stroke but which rapidly increases near the fully open position. My invention compliments such desire by providing means of chosing the amount of flow area desired to match the characteristic at least up to about 50% of disc rotation by varying the flow passages dimensions between the individual ribs. Yet, the ribs do not interfere materially with the maximum flow rate, since they do not extend (at 100% opening) materially beyond the profile of the disc hub.

These and other advantages and objections will be more apparent when viewed in light of the following detailed description and drawings.

DETAILED DESCRIPTION OF THE INVENTION

Figure 1:
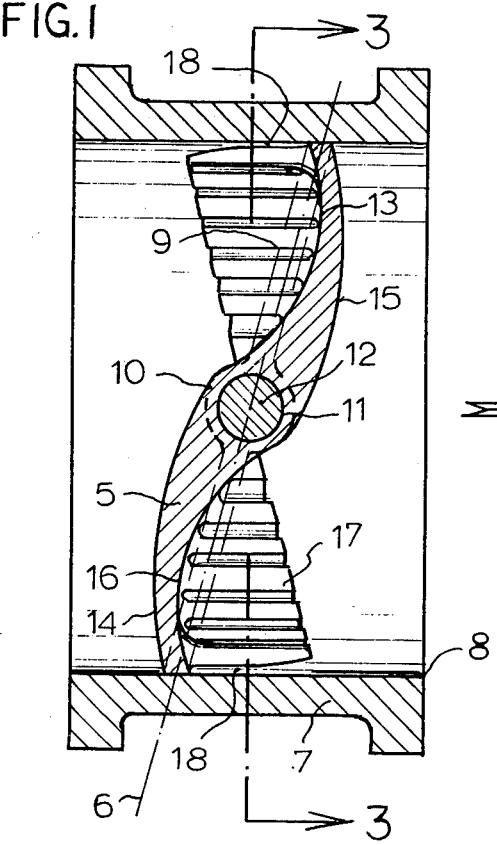
FIG. 1 is a vertical, sectional view of a preferred embodiment of my invention when installed in a butterfly valve housing and when turned into the closed valve position.

Referring to FIG. 1, my invented butterfly valve disc consists in its preferred embodiment of a disc 5, the planary axis 6 of which is tilted in comparison to the vertical axis of a conventional, state of the art, butterfly valve housing 7 (not part of my invention), having a circular bore 8 thus giving the discs a generally oval shaped surface area. A flat machined rim 9 forming the terminating outer periphery of disc 5 is in close contact with the inner wall of bore 8, whenever the valve is in the "closed" position, as indicated in FIG. 1, thus providing a sealing interface for the fluid to be controlled.

A hub 10 extends through the center of disc 5 and along the entire horizontal width of bore 8 and containing within a central circular hole 11 occupied by a valve shaft 12 which supports the tiltingly arranged disc 5. The horizontal axis of bore 8 devides disc 5 into an upper and one lower half. The upper half, tilting towards what is designated as the "downstream" side, has a concave wall portion 13, connecting the upper semi-circular portion of rim 9 with hub 10 while the lower half tilts towards, what is designated as the "upstream" side, and having a convex surface 14 connecting the lower semi-circular portion of rim 9 with hub 10, while facing upstream.

Each of the concave and convex surfaces 13 and 14 has an invertedly shaped surface 15 and 16 on the respective opposite side of disc 5. Each, the upper and lower half of disc 5, has a row of teeth-like ribs 17 formed at the outer rim of their respective concave portions 13 and 16 towards and beyond the vertical disc axis. Said teeth-like ribs 17 are arranged to extend generally parallel to the inner wall of bore 8 when the disc is in the closed position, as shown in FIG. 1, but are separated from the wall by a small clearance 18, so they may not physically touch the wall of bore 8 and interfere with the operation of the valve.

Figure 2:
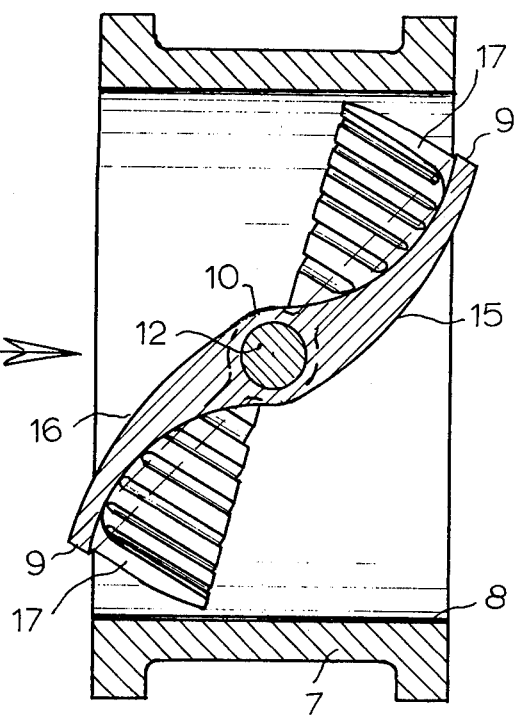
FIG. 2 is a vertical, sectional view of the same embodiment, as shown in FIG. 1, however, indicated here as being in the half open position.
Figure 3:
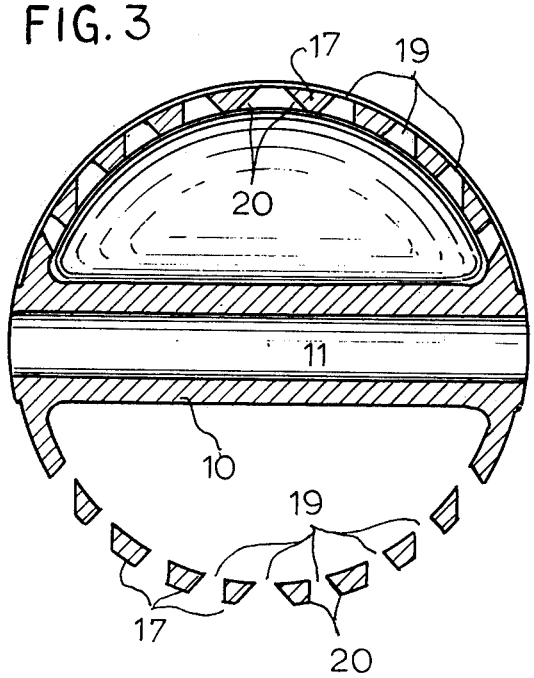
FIG. 3 is a vertical, cross-sectional view taken along the lines 3—3, as indicated in FIG. 1, with the butterfly valve housing removed for clarity.

Referring now to FIG. 3 in more detail, ribs 17 are separated a predetermined distance, in order to provide for rectangular or triangular shaped flow passages 19 which solely determine, in conjunction with its angular relationship with the inner wall of bore 8, the amount of flow passing a butterfly valve utilizing my invention, until a degree of rotation, indicated in FIG. 2, is exceeded and ribs 17 disengage from the wall of bore 8.

To obtain a maximum effective flow capacity of each passage way 19, it is arranged to avoid contraction of the oncoming fluid by tapering or rounding the entrance of each passage towards the upstream side. Such tapered entrances 20 therefore appear on opposite sides of ribs 17, depending which half of ribs 17 is pointing upstream. The downstream portion of each passage way, in contrast, has to be kept sharp in order to avoid pressure recovery, a phenomena leading to cavitation and increased noise thus producing a flow pattern that is in sharp contrast to that of conventional or, even low torque type butterfly discs, which have broad jet formations extending along the whole semicircle of a disc and attaching to the smooth wall of the disc on one side and to the smooth inner housing bore on the other side, thereby creating a fluid jet pattern not unlike one formed with a venturi type orifice i.e. providing a high degree of pressure recovery.

My invention provides for small individual jets discharging into a relatively large downstream area (when compared to their cross-section) and creating a more abrupt, turbulence producing flow pattern. Well-known fluid mechanics equation describe such "velocity headloss" $k$ $$\text{as } k = (1 - \frac{Ai}{Ao})^2;$$

wherein $Ai$ is the cross-sectional area of the jet and $Ao$ the discharge area.

Additional benefits are derived from the creation of small individual jets by reducing the size of vortexes, the by-product of pressure reduction. Smaller vortexes mean higher noise frequencies which, in turn, are better attenuated by the surrounding pipe wall, hence, leading to less observable sound pressure level.

Figure 4:
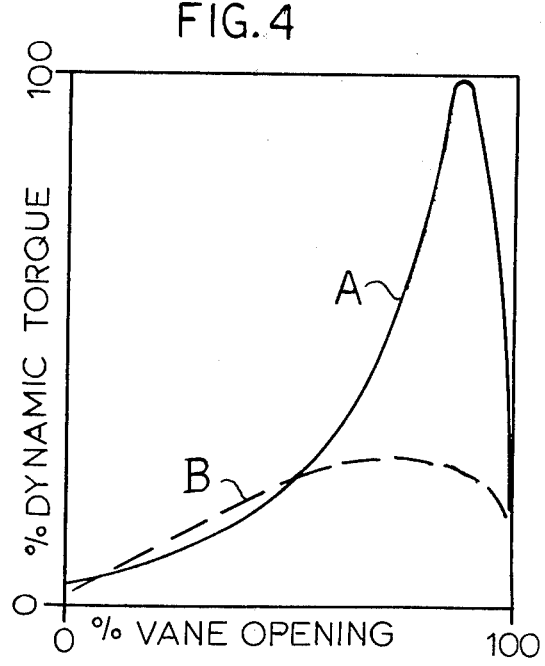
FIG. 4 is a graphic comparison of the dynamic torque characteristic of my invention compared to that of conventional state of the art butterfly discs.

The break-up of a smooth velocity profile on the upstream surface of disc 5 by ribs 17 and the "drag" produced by the lower half of disc 5 with attached ribs 17 pointing into the fluid stream (see FIG. 2), effectively counteract the dynamic lifting forces on the disc and thereby reducing the dynamic torque to a negligeable amount, as indicated in FIG. 4, where curve A represents the torque characteristic of a conventional disc, while curve B shows test results with a specimen of my invention.

Having shown my invention in a preferred configuration, should not exclude the possibility to make numerous modifications such as to attach lifting arms for the connection of valve stems to disc 5 and inserting bearings inside a bore 11, without departing from the spirit of my invention or from the scope of the attached claims.

I claim:

1. A low torque and low noise butterfly valve disc comprising:
   a. an oval shaped disc, the outer periphery being angularly off-set from the perpendicular axis of a straight, cylindrical bore of a butterfly valve and fitting closely within said cylindrical bore when in the closed valve position, one side of said disc facing up-stream, the other to the downstream side of said butterfly valve;
   b. a central, perpendicular hub section straddling the shortest width of said oval shaped disc and containing within a bore to receive a supporting valve shaft;
   c. a series of ribs protruding out of each side of said disc near the outer periphery of said disc and extending generally parallel to the longitudinal axis of said cylindrical bore of a butterfly valve, when viewed in the closed valve position, and forming two semi-circular rows, the protruding lenght of said ribs diminishing towards said hub section, one of said rows of ribs being located on the upstream side of said disc, while the other is located on the downstream side; said series of ribs forming substantial fluid impediments by extending into the path of fluid passing parallel to each side of said disc when in the open valve position;
   d. a number of fluid conducting passages formed between adjoining ribs.

2. A low torque and low noise butterfly valve disc as described in claim 1, wherein one half of said oval shaped disc is curved concavely, while the other half is curved convexly towards the upstream side of said disc.

3. A low torque and low noise butterfly valve disc as described in claim 1, wherein said fluid conducting passages consist of slots of trapezoidal cross-section whose larger width provides smooth entrance ways for passing fluids.

4. A low torque and low noise butterfly valve disc as described in claim 1, wherein said rows of ribs are arranged inside a diameter slightly smaller than that of the bore of a butterfly valve to avoid interference during rotation of said disc.

* * * * *